United States Patent
Lee et al.

(10) Patent No.: US 7,656,563 B2
(45) Date of Patent: Feb. 2, 2010

(54) METHOD FOR CONTROLLING THE ON/OFF FUNCTION OF AN LED IN A SCANNER

(75) Inventors: Ta-Yi Lee, Taipei (TW); Jung-Chiao Chang, Taipei (TW); Jobs Pen, Taipei (TW); Sherry Wang, Taipei (TW); Vector Wang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 1036 days.

(21) Appl. No.: 10/825,423

(22) Filed: Apr. 16, 2004

(65) Prior Publication Data

US 2005/0157350 A1    Jul. 21, 2005

(30) Foreign Application Priority Data

Jan. 16, 2004    (TW) ............................... 93101232 A

(51) Int. Cl.
*H04N 1/04*    (2006.01)

(52) U.S. Cl. ..................... 358/483; 358/475; 358/509; 358/474

(58) Field of Classification Search .................. 358/483, 358/475, 509, 474, 505, 484, 482, 506, 510, 358/494, 448, 450; 345/63, 46, 48, 76, 77, 345/82; 315/169.3, 169.4, 291; 362/611, 362/612; 250/559.42, 208.1
See application file for complete search history.

(56) References Cited

U.S. PATENT DOCUMENTS

| | | | | |
|---|---|---|---|---|
| 4,074,320 | A * | 2/1978 | Kapes, Jr | 358/482 |
| 4,402,017 | A * | 8/1983 | Takei | 358/484 |
| 4,806,775 | A * | 2/1989 | Uchida | 358/494 |
| 5,424,855 | A * | 6/1995 | Nakamura et al. | 250/208.1 |
| 5,625,470 | A * | 4/1997 | Ueta et al. | 358/505 |
| 5,969,372 | A * | 10/1999 | Stavely et al. | 250/559.42 |
| 6,646,770 | B2 * | 11/2003 | Lee et al. | 358/509 |
| 6,760,124 | B1 * | 7/2004 | Boerger et al. | 358/475 |
| 2007/0097463 | A1 * | 5/2007 | Razavi | 358/509 |
| 2007/0297020 | A1 * | 12/2007 | Shen et al. | 358/474 |

FOREIGN PATENT DOCUMENTS

JP    2003-162014    *    6/2003

* cited by examiner

*Primary Examiner*—Houshang Safaipour
(74) *Attorney, Agent, or Firm*—Rosenberg Klein & Lee

(57) ABSTRACT

A method for controlling ON/OFF of LED in a scanner which replaces CCFL with LED as a light source is provided so as to solve the problem of excessively long warm-up time of CCFL in the prior art. Meanwhile, to achieve intermittent heat dissipation, LED is switched ON/OFF according to the frequency of the scanner receiving optical signals.

11 Claims, 2 Drawing Sheets

METHOD FOR CONTROLLING THE ON/OFF FUNCTION OF AN LED IN A SCANNER

This Non-provisional application claims priority under 35 U.S.C. § 119(a) on Patent Application No(s). 093101232 filed in Taiwan on Jan. 16, 2004, the entire contents of which are hereby incorporated by reference.

FIELD OF THE INVENTION

The present invention relates to a method for controlling the ON/OFF function of an LED in a scanner and particularly to a method in which the LED is switched ON/OFF according to the frequency of optical signals received by the scanner.

BACKGROUND OF THE INVENTION

A scanner, aside from the keyboard and mouse, is a widely used computer input device. It can be used to input photos to generate personal electronic picture files, or input pictures to set up a personal Web site. Or hand-written letters may be sent by scanning and E-mail to replace FAX machines. The scanner can also be coupled with OCR software to enter contents of newspapers or books without the tedious labor of manual data entry. All this shows the powerful functions of the scanner. It greatly improves the efficiency in offices, learning and recreation.

The scanner achieves its functions mainly by digitizing the picture. Light is emitted from a lamp and reflected to a document held on a glass plate of the scanner. The bright and dark differences of the document form reflection light of different intensity. The reflection light passes through a series of reflection mirrors and focuses on a CCD at another end of the lens. The CCD transforms optical signals to correspond electric signals, namely analog signals. These signals are transformed by an A/D converter to become digital signals recognizable by computers. Through various interfaces such as an EPP (Enhanced Parallel Port), USB (Universal Serial Bus), or SCSI (Small Computer System Interface), the digital signals are sent to a computer.

The A/D converter is a semiconductor element for transforming the analog signals to digital signals. The electric signals obtained by the CCD are simulated signals corresponding to the brightness and darkness of the image. Namely, variations from the darkness to brightness of the image can be indicated by different electric potentials. They are changed continuously, and are called simulated amount.

In the scanner, the light source is important. The light sensed by the CCD is emitted from the lamp of the scanner. Impure or polarized light directly affects the scanning result. The professional scanners or some high-end home or office scanners automatically test the light intensity emitted from the lamp before scanning, especially when the scanner has just been powered on. As the lamp is not yet stable, and the scanner has a specific warm up period, only when the light intensity reaches the required standard will the light testing sensor in the scanner issue an approval instruction. Then the scanner can reach the optimal condition to process scan operation. Otherwise the light intensity cannot effectively present the details of the dark portions of the document.

Conventional scanners generally use a cold cathode fluorescent lamp (CCFL) as the light source. Such a lamp has a big drawback, it requires a warm up time when the scanner is powered on each time to enable the brightness of the lamp to increase to a stable condition. The warm up time could last about 1-3 minutes. This is according to many users not acceptable. Some users even mistakenly deem it as machine malfunction and request product return. This is especially significant and serious in a low temperature environment.

In view of the foregoing problems, some vendors have tried to use a light emitting diode (LED) as the light source of the scanner. While the LED can reduce waiting time when the scanner is cold started, it has some drawbacks such as a not adequate brightness and serious heat dissipation problem.

SUMMARY OF THE INVENTION

The primary object of the invention is to provide a method for controlling the ON/OFF function of an LED in a scanner to solve the heat dissipation problem of the LED.

In order to achieve the foregoing object, the method according to the invention uses a LED as the light source of the scanner. The scanner also outputs a time pulse to control the frequency, which the scanner relies to receive optical signals, thereby, the LED is switched ON and OFF according to the frequency through which the scanner receives optical signals.

Namely, when the pulse signal is at a low potential, the LED is switched ON to emit light to enable the scanner to receive the optical signals. On the contrary, when the pulse signal is at a high potential, the LED is switched OFF to stop emitting light and the scanner also stops receiving the optical signals. Thus the LED can disperse heat intermittently.

In addition, the scanner receives the optical signals through a charge-coupled device (CCD).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DESCRIPTION OF THE PREFERRED EMBODIMENTS

Figure 1:
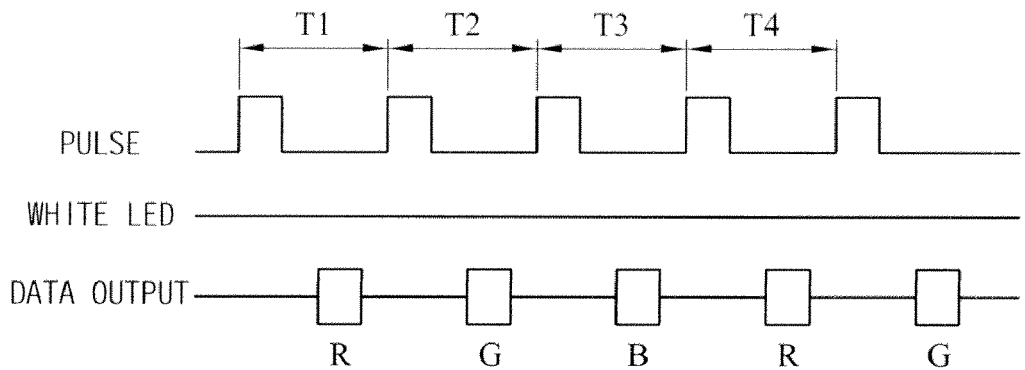
FIG. 1 is a schematic view of a first embodiment of a conventional scanner for controlling the ON/OFF function of an LED.

Refer to FIG. 1 for a first embodiment of a conventional scanner for controlling the ON/OFF function of an LED.

The scanner uses a white light LED as the light source, and outputs a time pulse. The white light LED is lighted continuously. When the time pulse signal reaches a low potential, the image sensor of the scanner receives the light emitted from the white light LED, and reads the red light signal contained therein. When the time pulse signal reaches a high potential, the scanner stops receiving the optical signals until the time pulse signal reaches the low potential again; then the scanner reads the green light signal contained in the light emitted from the white light LED. When the time pulse signal reaches the high potential again, the image sensor of the scanner stops receiving the optical signal again until the time pulse signal reaches the low potential again, and the scanner starts reading the blue light signal until the time pulse signals returns to the high potential. Thus the scanner completes one cycle of reading the optical signals of R/G/B three original colors. The scanner repeatedly processes such a cycle to read data continuously.

Figure 2:
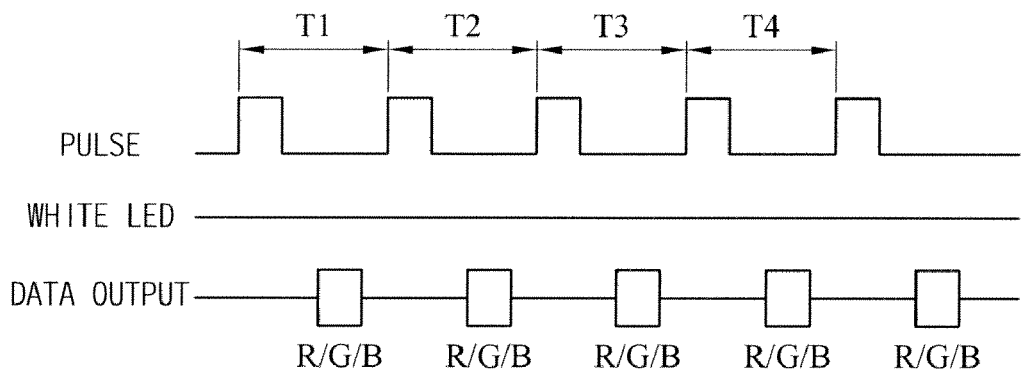
FIG. 2 is a schematic view of a second embodiment of a conventional scanner for controlling the ON/OFF function of an LED.

Refer to FIG. 2 for a second embodiment of a conventional scanner for controlling the ON/OFF function of an LED.

The scanner in this embodiment is substantially the same as the one in the first embodiment set forth. The scanner uses a white light LED as the light source, and outputs a time pulse. The white light LED is lighted continuously. When the time pulse signal reaches a low potential, the image sensor of the scanner receives the light emitted from the white light LED, and reads the optical signals contained therein. The difference is that when the time pulse signal reaches the low potential, the scanner continuously reads the red light signal, green light signal and blue light signal to complete a cycle. As the scanner reads the optical signals at a higher frequency, it has a greater resolution.

In the conventional scanners discussed above the original light source of a CCFL is replaced by an LED to overcome the problem of a lengthy warm up time. But the LED generates high temperature when being lighted for a long period of time. The service life of the scanner suffers when operating in a high temperature environment.

Figure 3:
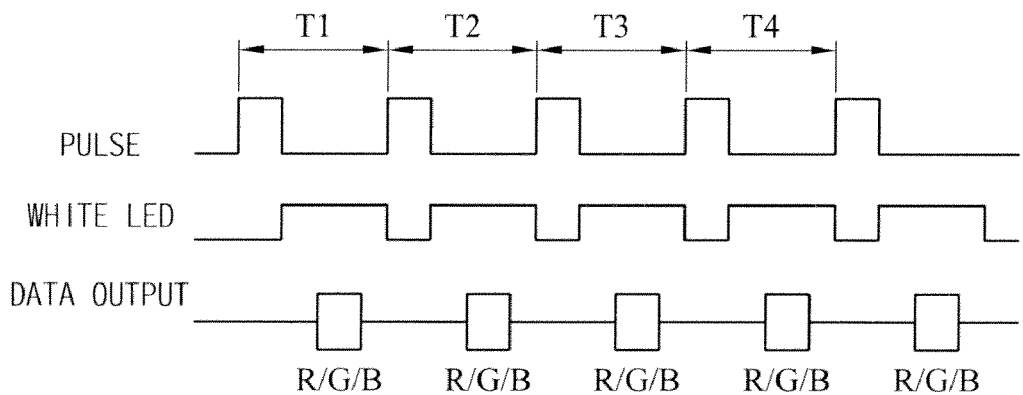
FIG. 3 is a schematic view of a first embodiment of the invention for controlling the ON/OFF function of an LED in a scanner.

Refer to FIG. 3 for a first embodiment of the invention that has the LED switched ON/OFF in a controlled fashion.

The scanner uses a white light LED as the light source, and outputs a time pulse. When the time pulse signal reaches a high potential, the white light LED is switched off without emitting light. When the time pulse signal reaches a low potential, the white light LED is switched on to emit light so that the image sensor of the scanner receives the light emitted from the white light LED, and reads the optical signals contained therein. When the time pulse signal reaches the high potential again, the white light LED is switched off and the scanner stops receiving the optical signals.

When the time pulse signal reaches the low potential every time, the scanner reads sequentially the red light signal, green light signal and blue light signal to complete one cycle. Or the frequency of the scanner, reading the optical signals, may be increased so that every time the time pulse signal reaching the low potential the scanner reads the red light signal, green light signal and blue light signal once to complete one cycle. Thereby the resolution of the scanner may increase.

Figure 4:
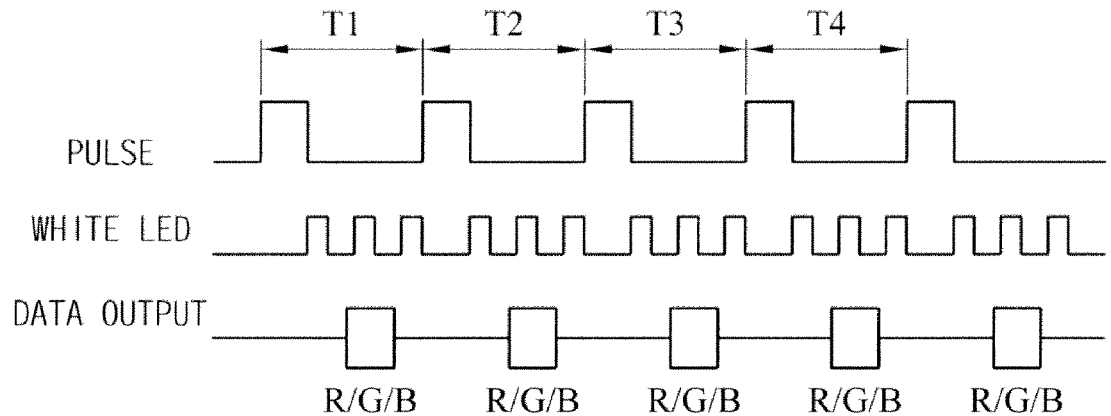
FIG. 4 is a schematic view of a second embodiment of the invention for controlling the ON/OFF function of an LED in a scanner.

Refer to FIG. 4 for a second embodiment of the invention that has the LED switched ON/OFF in a controlled fashion.

When the time pulse signal is at the low potential, the white light LED may be switched ON/OFF multiple times in one low potential pulse signal according to the increased frequency of the scanner reading the optical signals.

In summary, the LED emits light only when the scanner receives the optical signals. When the image sensor of the scanner stops receiving the optical signals, the LED is switched off without emitting light. Thus the LED can disperse heat during the OFF period. The ON/OFF frequency of the LED may be altered according to the frequency of the scanner receiving the optical signals. A different ON/OFF frequency also may match a different resolution to generate a different electric current and brightness. Meanwhile, heat dissipation may be performed intermittently to improve product efficiency.

The image sensor of the scanner is a charge-coupled device (CCD) which is a surface photoelectric device fabricated through microelectronic technology to perform photoelectric transformation. It is widely used in video cameras, digital cameras and scanners. In video cameras, matrix CCDs are used to capture plane images in X and Y directions. The scanner uses a linear CCD in the X direction. Scanning in the Y direction is accomplished through a mechanical apparatus of the scanner. A CCD chip has many photosensitive elements to convert different lights to different electric charges, to form a charged picture corresponding to the photo picture of the original scanning document.

Figure 5:
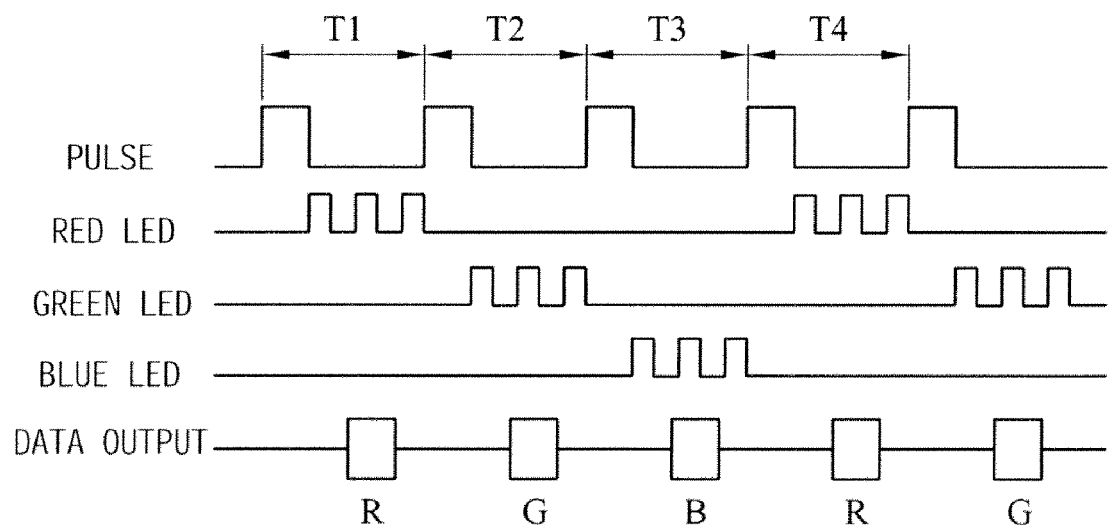
FIG. 5 is a schematic view of a third embodiment of the invention for controlling the ON/OFF function of an LED in a scanner.

Refer to FIG. 5 for a third embodiment of the invention that has the LED switched ON/OFF in a controlled fashion.

The scanner according to the invention, aside from using white light LED as the light source, may also use red light LED, green light LED and blue light LED as the light source. When the image sensor of the scanner receives the optical signals of red light, the red light LED is switched on and off according to the data reading frequency of the scanner. A similar operation pattern may be applied to the green light LED and blue light LED.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A method for controlling ON/OFF switching of an LED light source in a scanner, the scanner using a white light LED as the LED light source, comprising the steps of:
    switching the white light LED on and off at least once during a predetermined reading cycle time interval while a complete sequence of optical signals of the reading cycle of the scanner is received by the scanner, wherein the scanner controls the frequency of reading optical signals and the ON/OFF of the white light LED through a time pulse.

2. The method of claim 1, wherein the scanner reads red light optical signals when the white light LED is switched on.

3. The method of claim 1, wherein the scanner reads green light optical signals when the white light LED is switched on.

4. The method of claim 1, wherein the scanner reads blue light optical signals when the white light LED is switched on.

5. The method of claim 1, wherein the scanner reads a predetermined sequence of red, green, blue (R/G/B) optical signals of said reading cycle of the scanner when the white light LED is switched on.

6. The method of claim 1, wherein the scanner reads the optical signals through a charge-coupled device (CCD).

7. The method of claim 1, wherein the white light LED is switched on to allow the scanner to receive the optical signals when the time pulse is at a low potential.

8. The method of claim 1, wherein the white light LED is switched off to allow the scanner to stop receiving the optical signals when the time pulse is at a high potential.

9. A method for controlling ON/OFF switching of an LED light source in a scanner, comprising the steps of:
    switching the LED light source ON and OFF multiple times while an optical signal is received by the scanner, wherein the scanner reads a red light optical signal when the LED light source is switched ON.

10. A method for controlling ON/OFF switching of an LED light source in a scanner, comprising the steps of:

switching the LED light source ON and OFF multiple times while an optical signal is received by the scanner, wherein the scanner reads a green light optical signal when the LED light source is switched ON.

11. A method for controlling ON/OFF switching of an LED light source in a scanner, comprising the steps of:

switching the LED light source ON and OFF multiple times while an optical signal is received by the scanner, wherein the scanner reads a blue light optical signal when the LED light source is switched ON.

* * * * *